United States Patent
Grigorian et al.

(10) Patent No.: US 8,035,691 B2
(45) Date of Patent: Oct. 11, 2011

(54) METHOD AND APPARATUS FOR COMPENSATING FOR MOVEMENT OF A VIDEO SURVEILLANCE CAMERA

(75) Inventors: Samuel Nikolay Grigorian, Fresno, CA (US); Yuriy Kamko, Clovis, CA (US); Robert Sexton, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 98 days.

(21) Appl. No.: 11/496,811

(22) Filed: Aug. 1, 2006

(65) Prior Publication Data

US 2008/0030585 A1 Feb. 7, 2008

(51) Int. Cl.
*H04N 5/228* (2006.01)
*H04N 7/18* (2006.01)

(52) U.S. Cl. .............. 348/208.4; 348/208.14; 348/143

(58) Field of Classification Search .......... 348/143–161, 348/320–323, 208.3
See application file for complete search history.

(56) References Cited

U.S. PATENT DOCUMENTS

| | | | | |
|---|---|---|---|---|
| 5,650,813 A * | 7/1997 | Gilblom et al. | ........... | 348/36 |
| 5,903,319 A * | 5/1999 | Busko et al. | ........... | 348/607 |
| 6,940,998 B2 * | 9/2005 | Garoutte | ........... | 382/103 |
| 7,256,817 B2 * | 8/2007 | Yata | ........... | 348/143 |
| 2001/0033330 A1 * | 10/2001 | Garoutte | ........... | 348/153 |
| 2002/0051057 A1 * | 5/2002 | Yata | ........... | 348/142 |
| 2004/0119819 A1 * | 6/2004 | Aggarwal et al. | ........... | 348/143 |
| 2007/0160355 A1 * | 7/2007 | Sasaki et al. | ........... | 396/55 |

* cited by examiner

*Primary Examiner* — Sinh Tran
*Assistant Examiner* — Christopher K Peterson
(74) *Attorney, Agent, or Firm* — Paul T. Kashimba, Esq.

(57) ABSTRACT

A method of compensating for the movement of a video surveillance camera comprising the steps of moving an interlaced camera, capturing a first video field of a frame at a first point in time, capturing a second video field of a frame at a second point in time, determining the speed at which the camera is moving, and shifting the relationship between the first and second video fields based on the period of time between the first point in time and the second point in time and the speed at which the camera is moving.

20 Claims, 4 Drawing Sheets

FIG. 3

METHOD AND APPARATUS FOR COMPENSATING FOR MOVEMENT OF A VIDEO SURVEILLANCE CAMERA

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates to surveillance cameras and, in particular, to a method and apparatus for compensating the image blurring from a moving video surveillance camera.

Video surveillance systems generally use the interlacing method of displaying images to save the video bandwidth and still provide a smooth picture. In interlaced displays, the display alternates between drawing the even field, which consists of the even-numbered lines, and the odd field, which consists of the odd-numbered lines, of each frame. As used herein, frame consists of an even and odd field and refers to one of the still images, which make up the moving video. Similarly, the surveillance cameras used in these interlaced systems capture only half of the lines from each frame, i.e., one field at a time. The pairs of fields of each frame are perceived at the same time giving the appearance of a complete frame because of persistence of vision.

Video surveillance cameras that are movable, generally suffer degradation of the video when the camera is panned or tilted. The degradation blurs the video image and results in a dual image that has a ghost-like appearance. This undesirable blurring is most evident in images of static scenes viewed by a moving camera. Accordingly, there has been a long felt need in the industry for a video surveillance camera that has a minimal amount of blurring when the camera is moved.

SUMMARY OF THE INVENTION

In accordance with the present invention there is provided a method of compensating for the movement of a video surveillance camera comprising the steps of moving an interlaced camera, capturing a first video field of a frame at a first point in time, capturing a second video field of a frame at a second point in time, determining the speed at which the camera is moving, and shifting the relationship between the first and second video fields based on the period of time between the first point in time and the second point in time and the speed at which the camera is moving.

In addition, the present invention provides an apparatus for compensating for the motion of a surveillance camera comprising a moveable interlaced camera for generating first and second fields which comprise a frame, a shift register connected to the camera for receiving the first and second fields, a controller for providing control signals to the shift register, a detector connected to the camera and the controller for detecting the moving speed of the camera and providing a signal to the controller indicating the moving speed of the camera, and a display connected to the shift register for displaying an image created by the frame, wherein the controller provides a signal to the shift register to delay one of the first and second fields of the frame based on the time between the generation of the first and second fields and the signal indicating the moving speed of the camera.

The present invention is advantageous when a camera is in the scanning mode, such as when panning, or when an operator wants to look at the background in the picture. For example, this method can be used by the operator when trying to find an object which is obscured by the background. With the present invention, the image quality of video surveillance systems using interlaced video formats, such as NTSC with MPEG-4 compression or interlaced HDTV, is greatly improved. When static images or images where the shift due to motion is not great, the resulting video can be high quality, but motion shift causes the image quality to deteriorate and also reduces the compression efficiency. Various applications of video surveillance equipment require very high video quality with both static images as well as when a camera is panning. The present invention minimizes the blurring of the image when a camera is panning thereby providing higher video quality and maximizing the video compression efficiency of the surveillance system.

The present invention provides a user with a high quality video image when the camera is moving, such as during panning, but it is normally turned off when a user is following an object so that the followed image is not blurred. The panning mode is often referred to in the art as scan mode. If a user wants to follow an object, then the motion compensation method of the present invention can be automatically switched off. In one embodiment, a user can operate a control button to switch from the scan mode to the manual control mode to let the user follow an object of interest. In another embodiment, the mode can automatically switch when a user moves the joystick to control the movement of the camera. In still another mode, when a user takes control of the movement of the camera, the system stays in follow mode until the camera is being moved at a predetermined rate and then switches to the motion compensation method of the present invention. The predetermined rate or threshold can be set as required for the specific environment and use and can be reset by the user. In general the maximum predetermined rate or threshold would be set to a speed where the camera is being moved by the user at a rate that would be too fast to be suitable or reasonable for following an object. Once the system has switched into the motion compensation mode, the motion compensation is continued until the movement of the camera is below the threshold value.

Other advantages and applications of the present invention will be made apparent by the following detailed description of the preferred embodiment of the invention.

BRIEF DESCRIPTION OF THE SEVERAL VIEWS OF THE DRAWINGS

FIG. 3 is a diagram illustrating the image perceived when viewing a frame consisting of an odd field and an even field when an interlaced camera is panning.

DETAILED DESCRIPTION OF THE INVENTION

Figure 1:
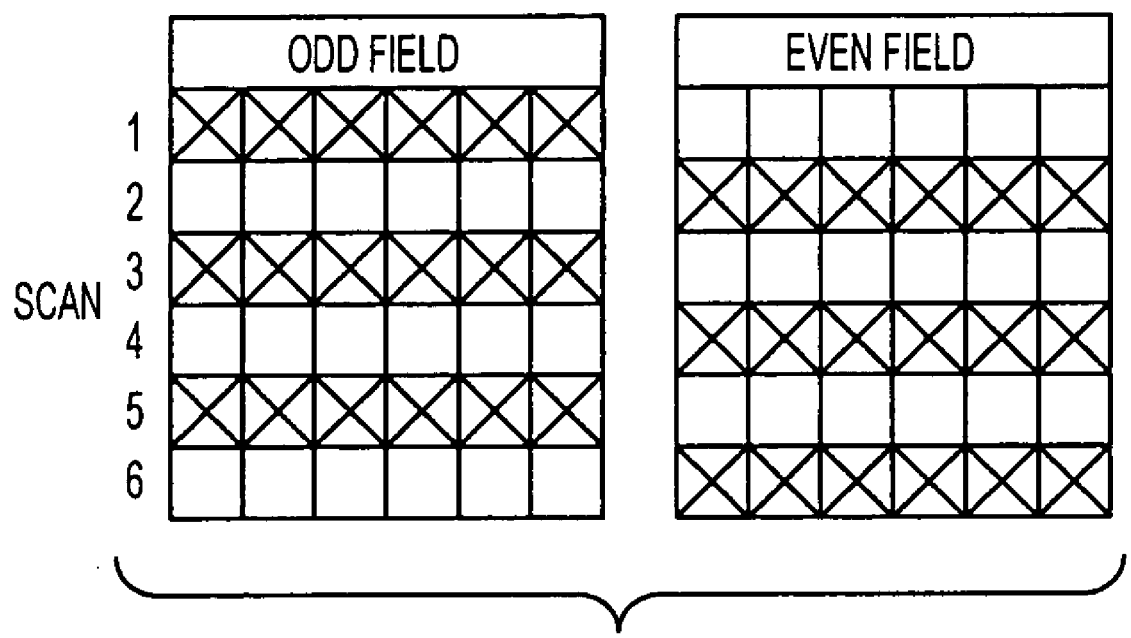
FIG. 1 is a diagram illustrating the scanning that is performed by an interlaced camera.

FIG. 1 illustrates the scanning that is performed by an interlaced surveillance camera. On the first scan by the surveillance camera, the odd field consisting of the odd lines is captured, which is indicated by the X's in the blocks under the odd field for the first scan line. In the second scan by the surveillance camera, the even field consisting of the even lines is captured, which is indicated by the X's in the blocks under the even field for the second scan line. The first and second scans comprise a first frame. Similarly, the third and fourth scans comprise a second frame, and the fifth and sixth scans comprise a third frame, as shown in FIG. 1. For NTSC systems, each frame consists of 480 lines out of a total of 525 with the other 45 lines being used for synchronization, vertical retrace, and other data. However, it should be understood that other interlaced video file formats could be used, such as interlaced HDTV.

Figure 2:
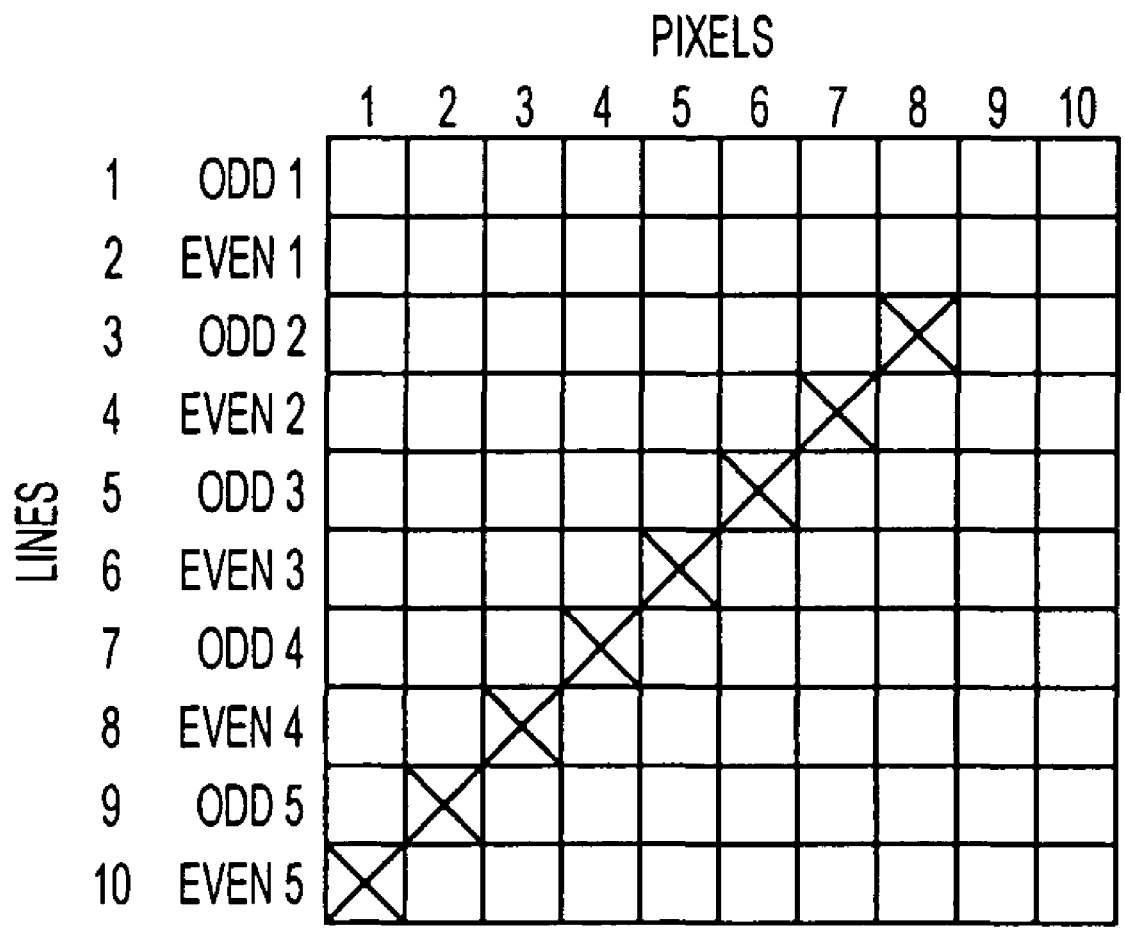
FIG. 2 is a diagram illustrating the image perceived when viewing a frame consisting of an odd field and an even field when an interlaced camera is stationary.

FIG. 2 is a diagram illustrating the image perceived by a person when viewing a frame consisting of an odd field and an even field when an interlaced surveillance camera is stationary. The image in the field of view of the camera in this example is a static diagonal line on a white background. As discussed in relation to FIG. 1, first the odd lines 1, 3, 5, 7, and 9 are scanned to form the odd field. Then the even lines 2, 4, 6, 8, and 10 are scanned to form the even field. Similarly, when the frame is displayed, first the odd field is scanned onto the display and then the even field is scanned onto the display. The image perceived by the viewer is a straight diagonal line that extends across the screen from pixel 1 in line 10 to pixel 8 in line 3.

Figure 3:
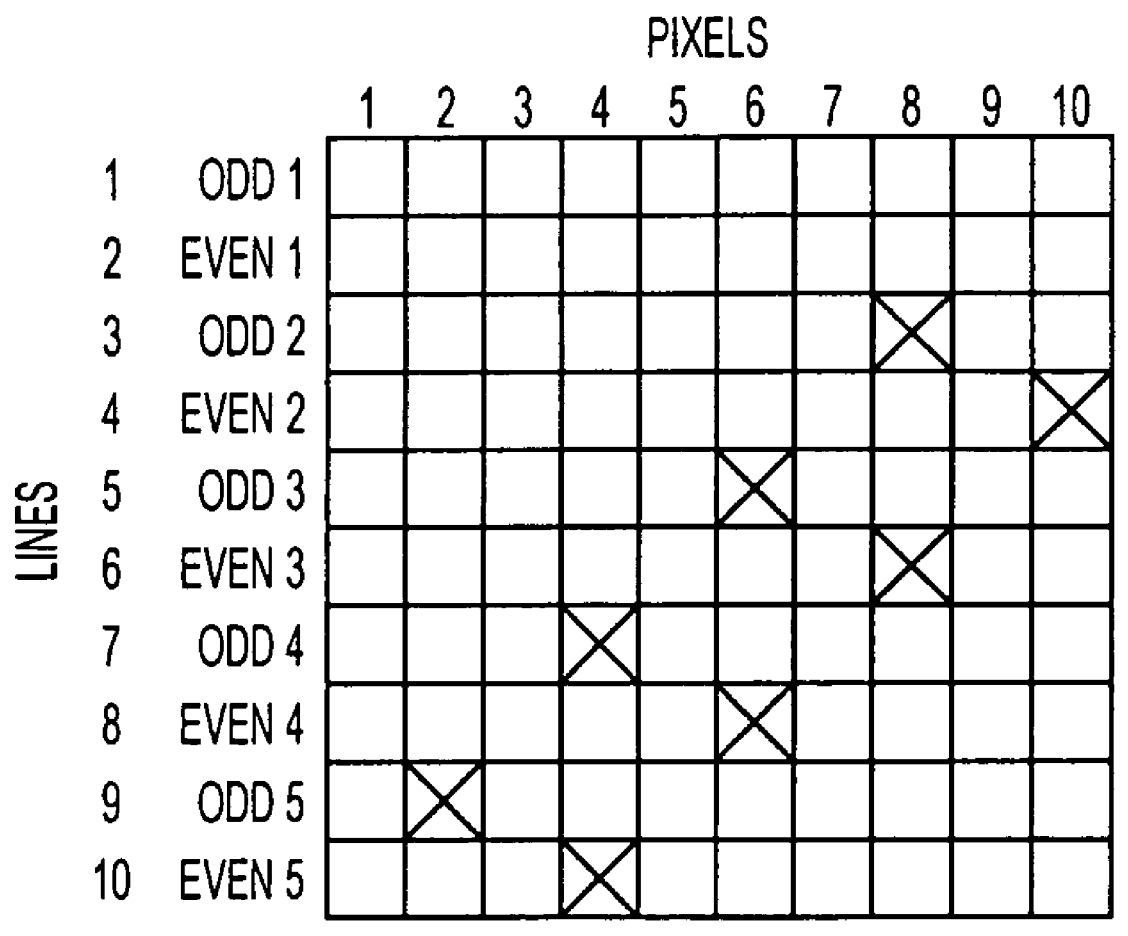

FIG. 3 is a diagram illustrating the image perceived by a viewer when a video surveillance camera is panning. The image in the field of view of the camera in this example is the same static diagonal line on a white background discussed in relation to FIG. 2. This example illustrates that the movement of the video camera in the horizontal direction has caused two blurred diagonal lines instead of a clear single diagonal line. The first diagonal line consists of pixel 2 in line 9, pixel 4 in line 7, pixel 6 in line 5, and pixel 8 in line 3. The second diagonal line consists of pixel 4 in line 10, pixel 6 in line 8, pixel 8 in line 6, and pixel 10 in line 4. The first diagonal line is contained in the odd field, and the second diagonal line is contained in the even field. The double diagonal line is caused by the delay in time between the first scan of the odd field and the second scan of the even field for the frame. In the case where the camera is not moving, as in FIG. 2, the portions of the diagonal line that appear in the odd and even fields do not differ since the spatial relationship between the field of view of the camera and the diagonal line do not change. The example shown in FIG. 3 illustrates a camera panning left at a speed that results in a shift of three pixels between the two scans.

Figure 4:
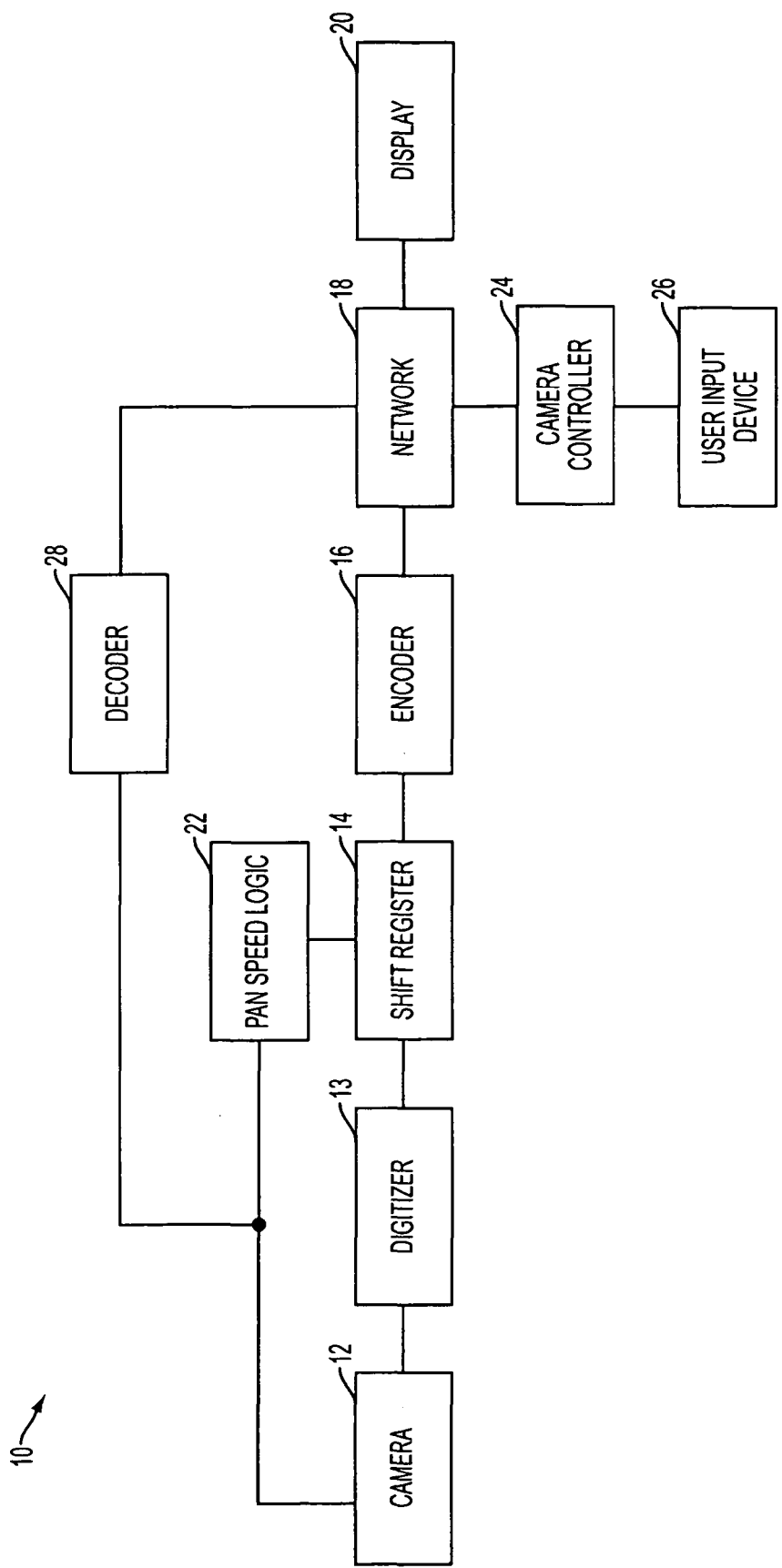
FIG. 4 is one embodiment for implementing the present invention.

One embodiment for implementing the present invention is illustrated in FIG. 4. A surveillance system 10 has a camera 12, which is capable of being moved, such as the Spectra® dome manufactured by Pelco of Clovis, Calif. Camera 12 can be an analog camera connected to digitizer 13, which provides a digital bit stream, or camera 12 can be a digital camera thereby eliminating the need for digitizer 13. The output of digitizer 13 is provided to a line buffer, such as shift register 14. The output of shift register 14 is connected to encoder 16, which can be, for example, an MPEG-4 encoder that provides an appropriate video stream to network 18. In an alternative embodiment, shift register 14 and encoder 16 can be included in a single logical unit. Similarly, digitizer 13 can also be included in the same logical unit. A display 20 is connected to network 18 to receive and display the video stream from camera 12 for viewing by a user. Display 20 can include appropriate video stream decoding circuitry, or display 20 can have a separate decoder. The embodiment shown in FIG. 4 includes encoder 16 and network 18 for remote viewing of camera 12 over a local area network or a wide area network, such as the Internet. Alternatively, the output of shift register 14 can be provided directly to display 20 for local viewing.

Pan speed logic 22 is connected to camera 12 to receive a signal indicating the pan speed, i.e., the angular speed, of camera 12, such as the one provided by the Spectra® dome manufactured by Pelco of Clovis, Calif. If camera 12 does not provide a signal indicating its pan speed, a pan speed detector can be used. Pan speed logic 22 provides a control signal to shift register 14 indicating whether the data in shift register 14 should be shifted or not. If the data in shift register 14 should be shifted, the control signal from pan speed logic 22 also indicates the amount that the data should be shifted. The angular speed of the camera platform must be known. Preferably, the angular speed of camera 12 should be detected every frame. Pan speed logic 22 then calculates the speed in degrees per second or pixels per second and provides a control signal to shift register 14 indicating the amount of delay required from shift register 14. A camera, which provides 30 frames per second, interlaced 2 to 1 to comply with the NTSC video standard, captures a field every $1/60^{th}$ of a second (actually 29.97 frames per second). Accordingly, the time between the scans of the odd and even fields is approximately $1/60^{th}$ of second. For example, the required delay may be in the range of 1-10 pixels for some applications to adjust the compensation between the odd and even fields of a frame. The size of the buffer is determined by the maximum delay desired, which in turn, is determined by the maximum panning speed of the camera. A shift register produces a discrete delay, such as n, where n is the number of shift register stages. For example, a sixteen stage shift register delays data in for up to sixteen clock pulses to data out. The embodiment of the present invention illustrated in FIG. 4, sends both the odd and even fields through shift register 14. Pan speed logic 22 then sends the appropriate signal, i.e., don't delay or delay, to shift register 14 as the fields for each frame pass through shift register 14. Alternatively, the field that is not to be delayed could bypass shift register 14 and be provided directly to encoder 16.

When one of the fields is shifted, the edges will not be aligned, but the center and the majority of the picture will be aligned. If camera 12 is panning rapidly, the resulting image will have blank pixels at the leading edge of the field because there is no video to fill in those pixels caused by delaying the field in shift register 14. Generally, the number of pixels with no picture on the leading edge is small and does not interfere with the normal use of surveillance system 10. Only the active video portion of the appropriate field is delayed. The synchronization signal is not delayed. The delay is applied to only the odd or even field depending on the direction of motion. Alternatively, both the odd and even fields can be shifted in the appropriate directions to modify or adjust the fields so that the desired alignment is obtained. Any overlay of text or graphics on the video must be added after the alignment compensation. Otherwise, the overlay will be blurred when the image is viewed.

The embodiment described above provides compensation for panning motion of a video camera. If the system is to provide compensation for tilting of the camera, then the video storage must be high-speed memory that is large enough to contain the maximum number of video lines to be compensated, i.e., delayed. Both pan and tilt compensation can be done at the same time by using two separate utilities: one for pan compensation and one for tilt compensation.

As discussed above, the NTSC video format transmits two images per frame, and these images are overlaid as interlaced video. To recombine the two images, it is necessary to know the angular horizontal speed of the camera and the effective angular width of a video line. The angular width is determined by the horizontal Field Of View (FOV) and the magnification of the lens system. Variable magnification lenses, or zoom lenses, reduce the FOV by the magnification setting. For example, if a camera has a 54° FOV at 1× magnification, the effective FOV will be 13.5° at 4× magnification. The amount of delay to be applied to either field of the video depends on these factors and the scan time per line of the video. In NTSC systems, this time is approximately 53 µs. Thus, for a camera with a 54° FOV, the scan rate represents approximately 1°/µs.

The horizontal, or pan, speed of the camera must be normalized to the field rate of the video format, for example, 60 Hz for NTSC. This is because the amount of compensation compensates for the one-field temporal difference between the two successive images of a frame. For example, with an NTSC camera rotating at 20°/s, the angular compensation required is $t_c$ is 20/60 or 0.333°. The magnitude must be accompanied by the direction thus requiring a convention for a sign/magnitude expression for the compensation.

Finally, pan motion compensation requires the repetitive solution of the following equation by pan speed logic 22:

$$t_c = (v_h \cdot t_f)/(FOV/(mag \cdot t_h)) \quad \text{(equation 1)}$$

where
  $t_c$=compensation time in seconds (s);
  $v_h$=rate of rotation of camera in degrees per second (°/s);
  $t_f$=period of the video field in seconds (s);
  FOV=camera field of view at 1× magnification in degrees (°);
  mag=magnification factor of the camera lens; and
  $t_h$=period of active video for one line in seconds (s).
In an implementation of this embodiment of the invention the following equation is also calculated by pan speed logic 22 to determine the number of pixels that an image must be shifted:

$$n_c = k \cdot t_c \quad \text{(equation 2)}$$

where
  $n_c$=the number of pixels that an image must be shifted
  k=a multiplier with the dimension (/sec) determined by the resolution of the video time delay mechanism. In practice, the multiplier converts the compensation time, which is normally expressed in microseconds, to pixels, i.e., picture elements. A standard image size has 720 pixels per video line. In NTSC, which has an active video time of 52.6 µs, a pixel is 720/52.6 or 13.7 pixels/µs. Thus k=13.7 for compensation time expressed in µs.
  $t_c$=compensation time in seconds (sec)
The calculations in equations 1 and 2 should be performed once per video frame so as to maintain the best compensation for horizontal motion.

Referring to FIG. 4, surveillance system 10 can have a camera controller 24 connected to network 18 to control the operation of camera 12. A control signal is provided from camera controller 24 over network 18 to decoder 28, which provides the control signal to camera 12. In an alternative embodiment, camera controller 24 could also be directly connected to camera 12. A user input device 26, such as a joystick, is connected to camera controller 24 to enable a user to control camera 12 by moving the joystick. Generally, the further a joystick is moved, the faster camera 12 moves. A user can use a joystick to follow an object of interest or to manually pan camera 12. The motion compensation system of the present invention is used when camera 12 is being moved quickly, such as during panning, which is often referred to in the art as scan mode, but it is normally turned off when a user is following an object, which is referred to in the art as follow mode, at a reasonable linear speed so that the followed image is not blurred. If a user wants to follow an object, then the motion compensation of the present invention can be automatically switched off. During setup, a user can enter a threshold value for the speed at which pan speed logic 22 turns the motion compensation on and off. For example, a user can utilize user input device 26 to select the maximum linear speed at which he will employ user input device 26 to follow an object on display 20 by moving the cursor on a bar graph shown on display 20 to select the maximum follow mode speed or by inputting a number value. Once the threshold is selected by the user during setup, the threshold value is sent by camera controller 24 over network 18 to decoder 28 where the threshold signal is decoded and provided to pan speed logic 22. Pan speed logic 22 stores this threshold value and compares the speed signal from camera 12 to the threshold value. When the camera is being moved by the operator at a speed that is less than the predetermined threshold value, pan speed logic 22 does not provide any shift signals to shift control signals to shift register 14. Once camera 12 is moved by the operator at a speed that is greater than the predetermined threshold value, pan speed logic 22 initiates the appropriate shift control signals to shift register 14 to implement the motion compensation method. The predetermined rate or threshold can be set as required for the specific environment and use and can be reset by the user as desired. In general the maximum predetermined rate or threshold would be set to a speed where camera 12 is being moved by the user at a rate that would be too fast to be suitable for following an object. Once pan speed logic 22 has switched into the motion compensation mode, the motion compensation is continued until the rate of movement of the camera 12 is below the threshold value.

In an alternative embodiment, a user can operate a control button on camera controller 24 or user input device 26 to switch from the scan mode, utilizing the motion compensation of the present invention, to the manual control mode to allow the user to follow an object of interest. In another embodiment, camera controller 24 can automatically switch modes when the user moves user input device 24 to control the movement of camera 12; however, this embodiment does not give the added advantage of motion compensation and hence an improved background image when the user is moving the camera at a speed that is greater than the threshold value.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of reducing blurring of an image from an interlaced camera moving in a scanning mode comprising: configuring an interlaced camera to have a field of view; moving the camera at a first scanning speed in a first scanning direction without following a specific object in the field of view; capturing an odd field and an even field at a predetermined period of time apart for a first frame with the camera to provide a first image when the odd field and even field are combined; and shifting one of the odd field and even field for the first frame as a function of the first scanning speed, first direction, and the predetermined period of time to generate a modified field so that when the modified field is combined with the other field to generate the first frame the blurring of the first image caused by the movement of the camera is reduced.

2. A method as recited in claim 1, wherein said moving step comprises panning the camera.

3. A method as recited in claim 1, wherein said moving step comprises tilting the camera.

4. A method as recited in claim 1, wherein said shifting step comprises determining a number of pixels that the camera has moved during the predetermined period of time and shifting the relationship between the odd and even fields based on the determined number of pixels.

5. A method as recited in claim 1, wherein said shifting step comprises delaying one of said odd and even fields.

6. A method as recited in claim 1, wherein said shifting step comprises the steps of providing the odd field to a shift register, providing the even field to a shift register, and controlling an amount of delay of outputting one of the odd field and even field from the shift register.

7. A method as recited in claim 6, wherein said shifting step further comprises determining a number of pixels that the camera has moved during the predetermined period of time and controlling the amount of delay of outputting one of the odd field and even field from the shift register based on the determined number of pixels.

8. A method as recited in claim 7, wherein said moving step comprises panning the camera.

9. A method as recited in claim 1, wherein said shifting step comprises solving the following equation $$t_c = (v_h \cdot t_f)/(FOV/(mag \cdot t_h))$$

where
$t_c$ = compensation time;
$V_h$ = rate of rotation of the camera;
$t_f$ = period of the video field of the camera;
FOV = field of view of the camera at 1x magnification;
mag = magnification factor of the lens of the camera; and
$t_h$ = period of active video for one line for the camera.

10. A method as recited in claim 9, wherein said shifting step further comprises solving the following equation $$n_c = k \cdot t_c$$

where
$n_c$ = the number of pixels that an image must be shifted;
k = a multiplier determined by the resolution of the video image of the camera and the active video time of the camera; and
$t_c$ = compensation time.

11. A method as recited in claim 1, further comprising determining the speed at which a user is moving the camera, comparing the determined speed at which a user is moving the camera to a predetermined speed, and wherein said shifting step is performed when the speed at which a user is moving the camera is greater than the predetermined speed.

12. A method as recited in claim 11, further comprising discontinuing said shifting step when the determined speed at which a user is moving the camera is less than the predetermined speed.

13. An apparatus for reducing blurring of an image from an interlaced camera moving in a scanning mode comprising: an interlaced camera having a field of view and capturing an odd field and an even field at a predetermined period of time apart for a first frame to provide a first image when the odd field and even field are combined; a device for moving the camera at a first scanning speed in a first scanning direction without following a specific object in the field of view; and a circuit for shifting one of the odd field and even field for the first frame as a function of the first scanning speed, first direction, and the predetermined period of time to generate a modified field so that when the modified field is combined with the other field to generate the first frame the blurring of the first image caused by the movement of the camera is reduced.

14. An apparatus as recited in claim 13, wherein said first scanning speed is the panning speed of said camera.

15. An apparatus as recited in claim 13, wherein said first scanning speed is the tilting speed of said camera.

16. An apparatus as recited in claim 13, wherein said apparatus further comprises a detector for detecting the speed of movement of the camera.

17. An apparatus as recited in claim 16, further comprising a camera controller connected to said camera and a user input device connected to said camera controller for providing input to said camera controller to control the speed at which said camera is moved and wherein said controller compares the speed detected by said detector to a predetermined speed and said controller provides said signals to said circuit when the speed detected by said detector is greater than said predetermined speed.

18. An apparatus as recited in claim 17, wherein said controller does not provide said signals to said circuit when the speed detected by said detector is less than said predetermined speed.

19. An apparatus as recited in claim 13, wherein said camera has a video field period, a field of view, a magnification factor, and a period of active video for one line of the image and said controller solves the following equation $$t_c = (v_h \cdot t_f)/(FOV/(mag \cdot t_h))$$

where
$t_c$ = compensation time;
$v_h$ = rate of movement of said camera;
$t_f$ = period of the video field of said camera;
FOV = field of view of said camera at a predetermined magnification factor;
mag = magnification factor of said camera; and
$t_h$ = period of active video for one line for said camera.

20. An apparatus as recited in claim 19, wherein said camera has a video image resolution and an active video time and said controller solves the following equation $$n_c = k \cdot t_c$$

where
$n_c$ = the number of pixels that an image must be shifted;
k = a multiplier determined by the resolution of the video image of said camera and the active video time of said camera; and
$t_c$ = compensation time.

* * * * *